Figure 1:
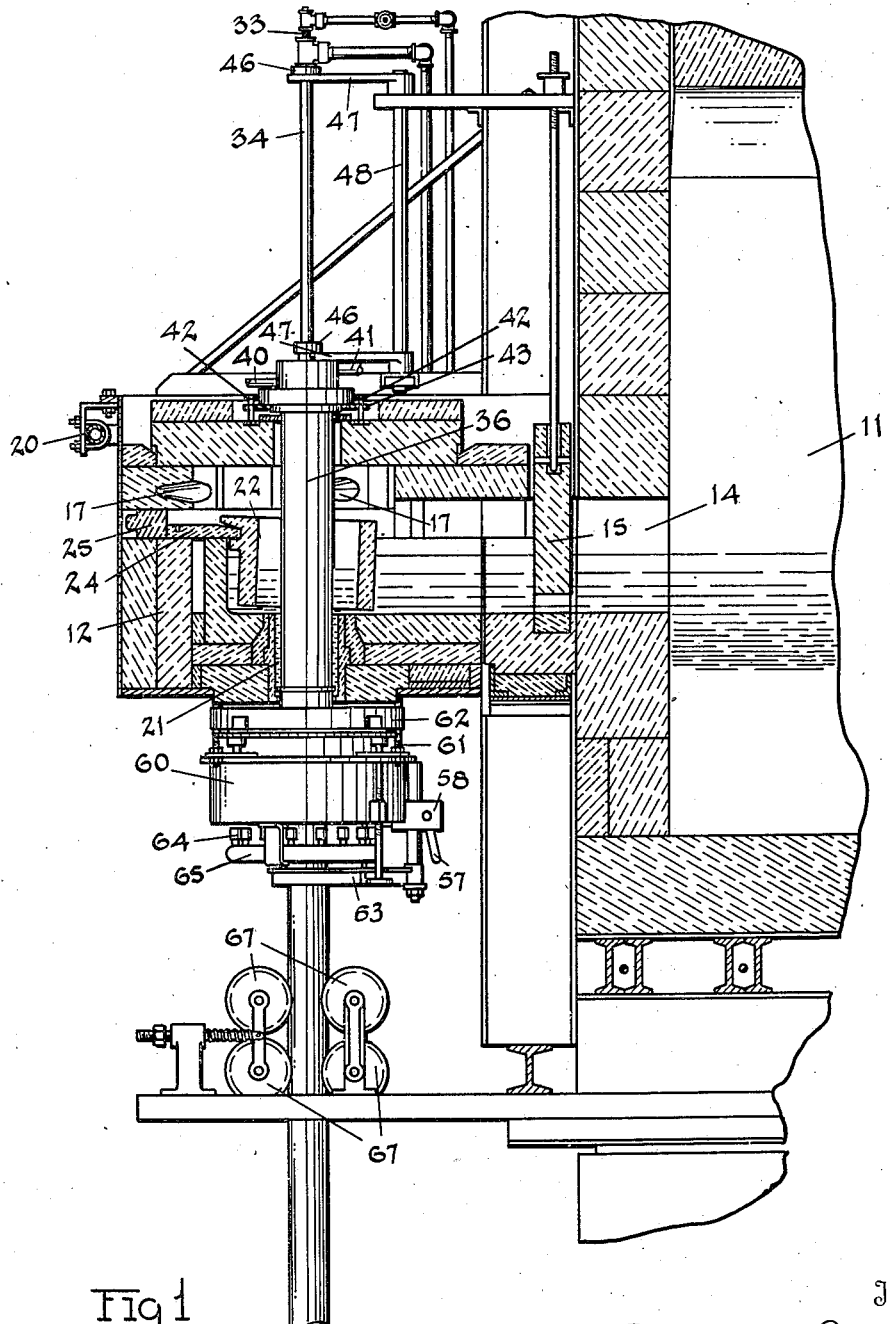

Dec. 11, 1945.  E. DANNER  2,390,926
HOLLOW GLASSWARE-FORMING APPARATUS
Filed Feb. 24, 1941   5 Sheets-Sheet 1

Inventor
Edward Danner
By
Attorney

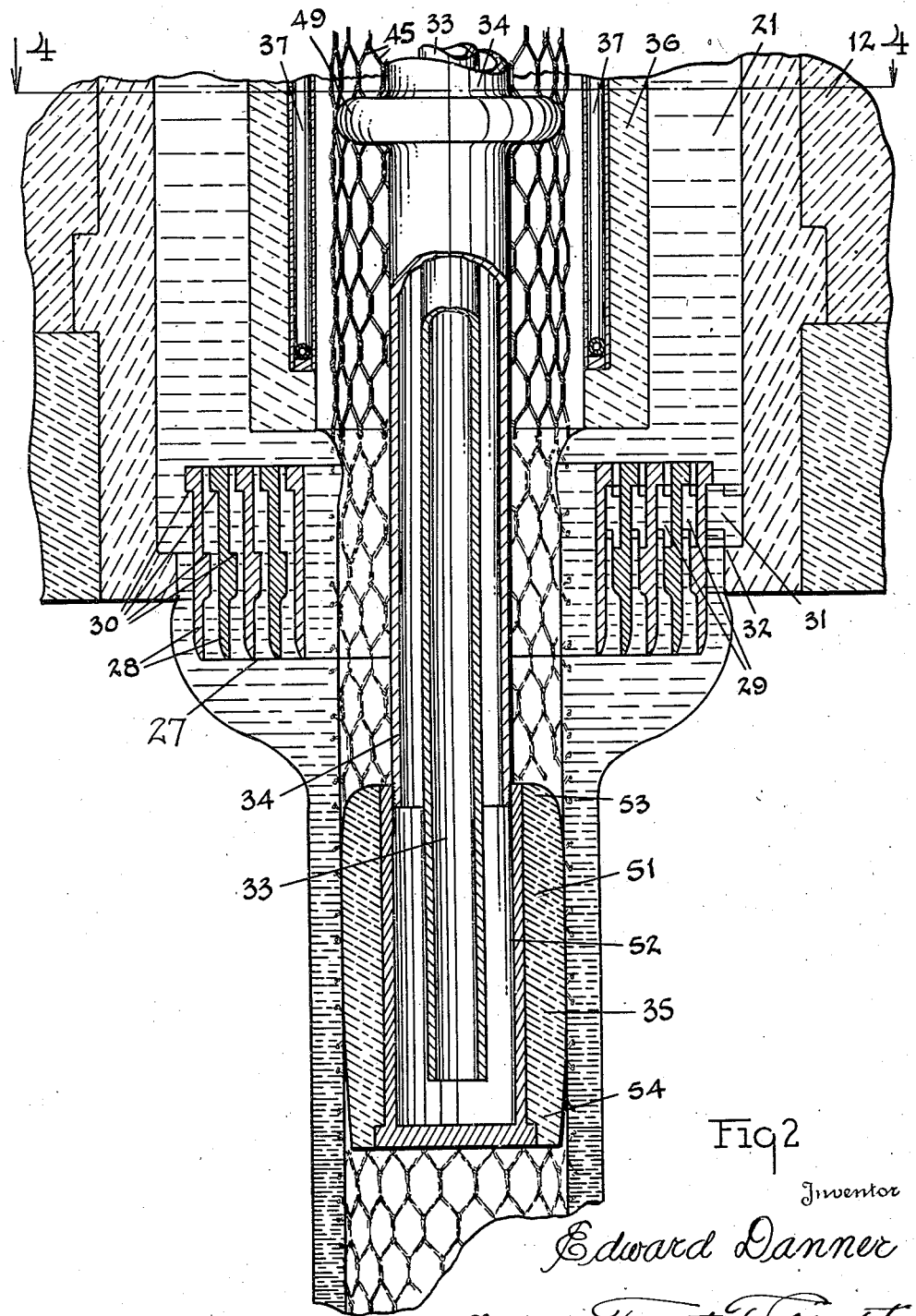

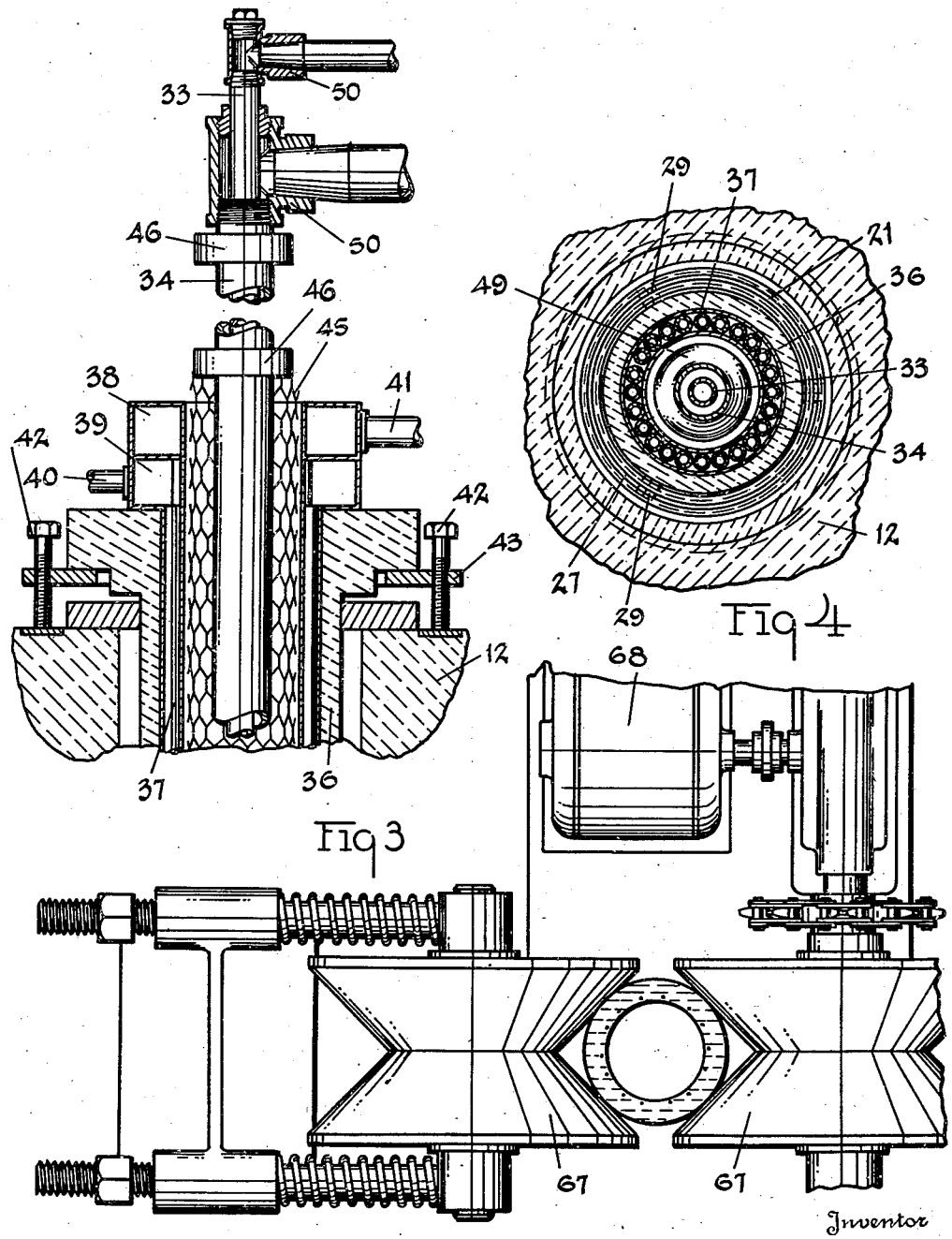

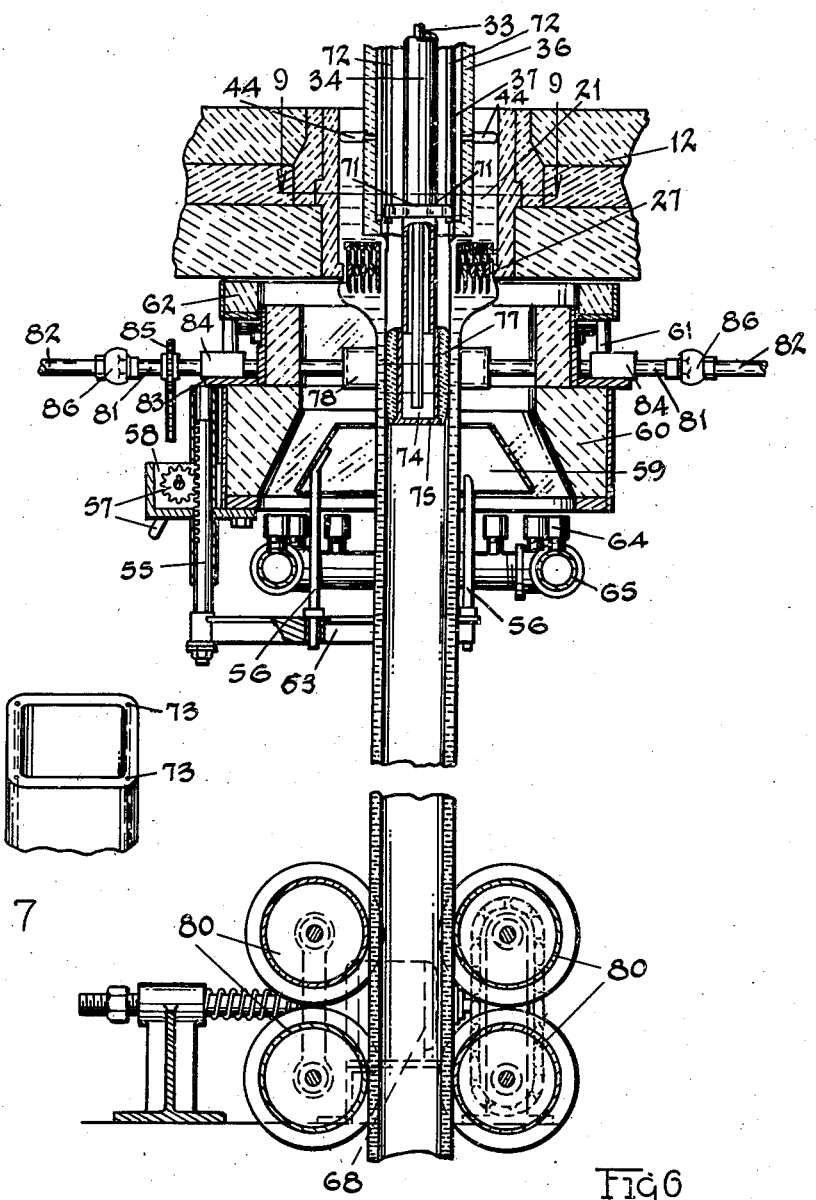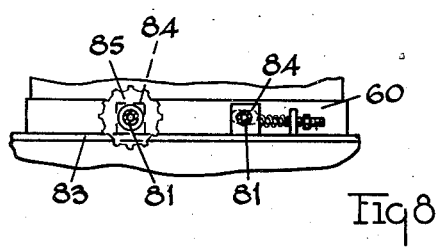

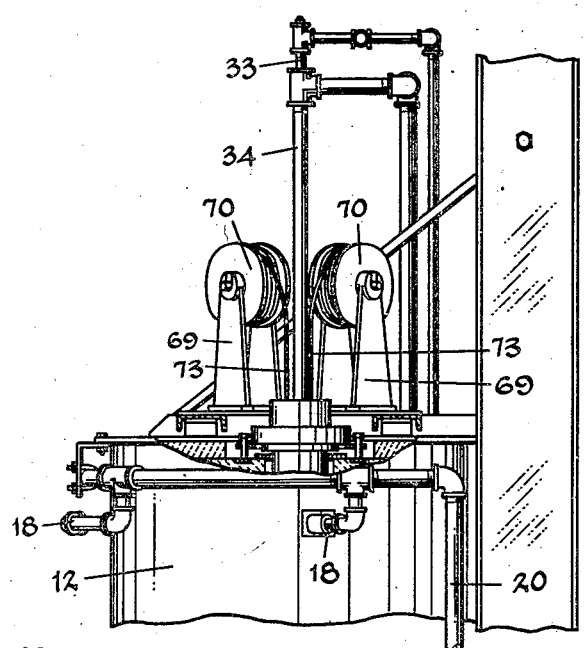
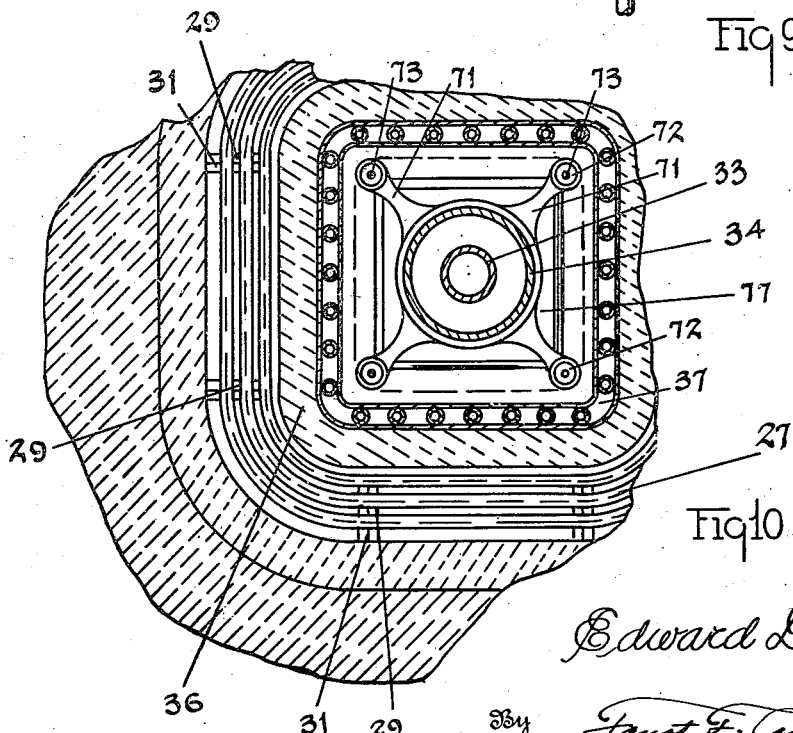

Patented Dec. 11, 1945

2,390,926

UNITED STATES PATENT OFFICE 2,390,926

HOLLOW GLASSWARE-FORMING APPARATUS

Edward Danner, Newark, Ohio

Application February 24, 1941, Serial No. 380,180

23 Claims. (Cl. 49—17.1)

The invention has for its object to continuously produce hollow glassware, in the form of cylinders, or, cross-sectionally, in the form of squares or oblong rectangular shapes, and having relatively large cross dimensional measurements and wall thickness.

The invention, also, has for its object to provide means for incorporating one or more reinforcing members within the walls of glass bodies, wherein both the bodies and their walls have relatively large cross-sectional dimensions.

The invention, also, provides means for maintaining the rigidity of reinforcing members, in advance of their incorporation in the molten glass.

The invention, also, provides a substantially fixed body for producing a uniform definite interior size and shape and surface smoothness of the glassware, as it is moved slidably over the fixed body.

The invention, also, provides a hollow fixed body for shaping glassware interiorly, as it is formed, and means for interiorly cooling the hollow body for increasing the ware's fixedness of form that is produced by the body and prevent deformation or heat-deterioration of the hollow body.

The invention, also, provides one or more exterior pressure members that press the glassware, while in a moldable state, against a relatively fixed body within the glass to insure conformation of the glass wall with the cross-sectional contour of the fixed body and, if desired, to surface indent the glass.

The invention, also, provides a forebay of a glass-melting tank, having an outlet and a refractory tube extending through the forebay and into the outlet for directing a reinforcing member into the molten glass upon its exit from the forebay.

The invention, also, provides a refractory tube extending to near an outlet for molten glass and forming a passage for a glass-reinforcing member to the molten glass as it leaves the outlet and means for adjusting the refractory tube to vary the rate of quantity flow of glass through the outlet.

The invention consists in other features and advantages which will appear from the following description and upon examination of the drawings. Structures containing the invention may partake of different forms and still embody the invention. To illustrate a practical application of the invention, I have selected a hollow glassware-forming apparatus as an example of the various structures and details thereof that contain the invention and shall describe the selected structure hereinafter, it being understood that variations may be made and that certain features of my invention may be used to advantage without a corresponding use of other features of the invention and without departing from the spirit of the invention, as presented in the claims. The particular structure selected is shown in the accompanying drawings and described hereinafter.

Fig. 1 illustrates a view of a vertical section of a part of a glass-melting tank and a section of the forebay. Fig. 2 is a vertical section of the molten glass outlet of the forebay and of the glass-shaping means. Fig. 3 illustrates a view of a section of a means for maintaining a metal reinforcing element cool, in advance of its embedment in the molten glass. Fig. 4 is a broken view of a section, taken on the plane of the line 4—4, indicated in Fig. 2. Fig. 5 is a view of a glass-supporting means for causing the glass to move uniformly from the shaping member by its weight or added draw. Fig. 6 is a view of a molten glass-shaping means for producing glass having a substantially square or rectangular cross-section. Fig. 7 illustrates a perspective view of an end part of the glassware, formed by the shaping element shown in Fig. 6, having reinforcing elements in its corners. Fig. 8 is a view of a bearing support for glass-shaping rollers. Fig. 9 illustrates a side view of a top part of the forebay and shows wires that are fed to square hollow glass to reinforce the corners of the formed glass. Fig. 10 is a broken view of a cross-section, taken on the plane of the line 9—9, indicated in Fig. 6.

In the forms of constructions illustrated in the figures, the glass is melted in the melting tank 11 and conveyed to the forebay 12, through a suitable channel 14, as controlled by a gate 15. The forebay 12 is, preferably, cylindrical in form and is provided with recesses 17, in the upper part of the forebay, having axes that are substantially tangential to a circle having a diameter smaller than that of the interior of the upper part of the forebay, and burners 18, supplied by fuel gas through a fuel gas pipe 20 (Fig. 9), when ignited, produce a whirling flame over the surface of the glass in the forebay.

The forebay has a centrally located outlet 21 in its bottom and a distributor 22 is located in the forebay and is disposed about the inner terminus of the outlet 21. The distributor 22 has a length slightly greater than the depth of the glass that is ordinarily maintained in the forebay. The distributor may be adjustably raised by wedge blocks 24 that extend radially from openings, in the wall of the forebay, that may be closed by plugs 25. Thus, the lower edge portions of the distributor 22 may be variously adjusted to regulate the quantity flow of the glass beneath said edge portions and cause it to move circularly and intermix before it enters the outlet 21.

The outlet 21 has, at its outer terminus, a glass-shaping element 27 that comprises a plurality of coaxially disposed shells 28 that are spaced from each other and connected together by a plurality of spacing blocks 29. The glassware-shaping element is supported by the spacing blocks 31 located intermediate the outer shoulder of the outermost shell and the shoulder 32 formed on the lower edge of the outlet 21. Each of the shells 28 have an inner and outer shoulder 30, except the innermost shell, which does not have an inner shoulder, and the shell spacing blocks 29 are located intermediate the shoulders and are spaced from each other to permit the glass to flow from the outlet at a desired quantity rate to progressively form the hollow ware having a relatively thick wall.

A pair of coaxial water pipes 33 and 34 extend from a point well above the forebay, through the forebay, and to well below the glass-forming element 27. The outer pipe 34 is preferably formed of refractory metal to withstand the heat of the glass in the forebay and the glass entrapped by the shaping element 27 located in heat radiating relation to the pipe 34. The lower end of the outer pipe 34 is connected to and supports a fixed body that sizes or surface shapes the glass. The shaping body or member 35 contacts the inner surface of the hollowly formed molten glass. It has a smooth surface over which the glass will slide. It is provided preferably with a smooth graphitised or graphitic exterior surface, and operates to uniformly smooth and size the interior surface of the glass throughout the length of the ware. If desired, the sizing member may be provided with an exterior shell formed of graphite or graphitic slabs. A cooling fluid is fed to the interior of the sizing, or shaping, member. The shaping member 35 will thus smooth out irregularities that may be formed on the inner surface of the glass and true up, or size to a desired size, the surface contour. Also, the cooling produced by the flowing fluid eventually sets the glass to the final pre-determined size, before it completes its movement over the member 35. Spalling, by the difference in contraction of the wire and the glass, is prevented since the wire reinforcing member was cooled or chilled by the water pipes 37 and 34, before its submergence in the glass, thereby producing a condition which offsets the effect of the difference in contraction within the glass body, when the body of the glass is chilled while on the member 35.

The upper parts of the pipes 33 and 34 are surrounded by a refractory shell 36 that extends through the forebay to near the hollow glass-shaping element 27. The shell 36 has, on its inner surface, a metal water jacket that may be formed of a plurality of pipes 37 that may be coupled together at their lower ends in pairs. One of each pair of pipes is connected to the annular water box 38 (Fig. 3) and the others are connected to the annular water box 39. The box 39 is connected to a source of supply of water by the pipe 40 and the box 38 is connected to a point of water discharge by a pipe 41 so that the water is circulated through the pipes to keep the interior of the refractory shell 36 cool.

The shell 36 is supported by the adjustable screws 42 that extend through an annular plate 43 for adjusting the height of the lower end of the shell 36 with respect to the lower end of the outlet 21 to regulate the quantity rate of inward flow of the glass with respect to the inner shell 28 of the glass-shaping element 27 (Figs. 2 and 6). The lower end of the shell 36, within the outlet 21, is provided with pins 44 secured in holes formed in the shell wall and which extend laterally to engage the inner surface of the outlet 21 and locate the shell centrally with respect to the outlet.

Netted wire 45, of any net form but sufficiently refractory to resist the heat of the molten glass upon submergence, may be formed cylindrically and placed around the upper end parts of the pipes 33 and 34 and its side edges fastened to each other, if desired, and allowed to move down along the pipes until the lower end of the netted wire is submerged in the glass at the lower end of the shell, whereupon, the wire will be moved down with the glass. While in the shell 36, the netted cylindrical wire 45 is cooled by fluid circulation in the pipes 37 at the wall of the shell, as well as by the fluid in the pipes 33 and 34 that extend to the shaping member 35 and, consequently, the wire is kept from overheating which prevents spalling of the glass as it sets or hardens, when brought finally to atmospheric temperatures.

If desired, the upper end part of the pipe 34, above the forebay, may be provided with collars 46, and arms 47 may be connected to a vertical and pivotally supported rod 48 mounted in frame parts of the tank and forebay to alternately engage the collars and afford a means for supporting the pipes 33 and 34 in position and, also, allow the netted wire to be lowered into the shell 36, upon countermovement of the arms.

The pipe 34 is, preferably, provided with a torus ridge 49 that forms a guide for the descent of the cylindrical, netted wire 45. If desired, the upper ends of the pipes 33 and 34 may be disconnected from their source of supply of fluid and point of discharge by removably connectable tapered end parts and sockets 50, and the cylindrical, netted wire 45 may be slipped over the upper ends of the pipes 33 and 34 and ridge 49 and permitted to descend to the surface of the glass as it flows through the inner of the shells 28 of the glass-shaping element 27.

The shaping member 35 has a graphitized shaping surface part, preferably in the form of a graphite cylinder 51, or a plurality of graphite slabs, and has an inner metal shell 52 that is connected to the pipe 34. The graphite 51 is supported on the shell and is formed to have a rounded upper end part 53 and a sloping or tapered lower end part 54.

A shell 60 is located below the forebay 12 and is supported by the rods 61 to locate its upper end a short distance from the bottom of the forebay and form an outlet at its upper end to produce a desired draft in the shell that may be effectively varied by a damper ring 62 that may be suitably adjustably mounted to vary the effective area of the opening between the shell and the bottom of the forebay.

The lower end of the shell 60 is, also, open, and burners 64, mounted on and connected to a circular fuel pipe 65, produce flames for heating the interior of the shell. Within the heat-confining shell 60 and below the forming element 27 is located a heat-controlling shield 59 (Fig. 6) supported on a frame 63 by rods 56 connected to a rack bar 55 and adjustably moved by a crank and pinion 57 rotatably supported in a suitably supported housing 58. The shield operates to reflect the heat of the burners 64 to the glass and may be adjusted to vary the intensity of the heat applied to the surface glass and, thus, control its viscosity. Also, by adjustment of the shield 59, a zonal temperature control may be produced, while the drawing in of cool air may be controlled by adjustment of the damper ring 62. Thus, the viscosity and consequent fluidity of the glass of the hollow ware may be controlled during its downward movement.

At a point well below the heat-confining shell 60, two pair of rollers 67 may be rotated at a desired rate by a suitable motor 68 to produce a desired movement of a cooled part of the glassware, after it has been formed.

In the form of construction shown in Figs. 6 to 9, a hollow glassware is formed that is rectangular or square in cross section and is reinforced by wires that are embedded in the corner parts of the glassware.

The wires, or reinforcing members, are located on spools 70 rotatably supported on uprights 69 mounted on the top of the forebay and may be threaded through one or more tubes 72, each of the tubes being supported by one or more arms 71, located on the cooling pipe 34.

The wires 73 are passed through the tubes 72, which are located in the shell 36, and the ends of the wires 73 are submerged in the glass. As the glass descends, the wires are drawn through the shell and cooled by the circulation of water through the pipes 33 and 34 and the pipes 37.

The shaping member 74 is, also, provided with a metal shell 75 surrounded by graphite 77, in slab form. One or more pairs of rollers 78, which may be smooth or knurl-surfaced, are located outside of the hollow ware and rotatably mounted and pressed against the glass, as the glass moves intermediate the rollers and the glass-shaping member 74. The glass is pressed, by the rollers, against the oblong sides of the glass-shaping member and, if desired, is impressed to form roughened exterior surfaces, while the interior of the glass surface is smoothed and somewhat cooled by the cooling effect of the glass-shaping member caused by the circulation of the cooling fluid through the pipes 33 and 34.

The rollers 78 may be supported on hollow shafts 81 and connected to pipes 82, which connect with a source of cooling fluid to cool the rollers 78. The shafts 81 are supported in bearing blocks 84 located on a supporting plate 83 and are rotated by a suitable motor that is connected, through the sprocket chain and gear 85, to the shafts 81. The hollow shafts 81 are connected to the pipes 82 by universal connector joints 86. Thus, the inner and outer surfaces of the structural glass may be controllably cooled by directing a cooling fluid through the shafts 81. Also, the glassware may be controllably drawn from between the rollers 78 and the shaping member 74 by two pair of rollers 80 that engage the sides of the hollow glassware when it has becomes substantially hardened.

I claim:

1. In a reinforced glassware forming apparatus, a container for holding a supply of molten glass and having an outlet, a hollow refractory body located in the container and having openings in its ends for directing a reinforcing material into the molten glass below one of the openings, a glass shaping element located adjacent the outlet for converting the glass flow to ware form, a surface smoothing and sizing member, a hollow member extending through the refractory body for supporting the surface sizing member below the glass shaping element and spaced therefrom and within the shaped glass and in surface contacting relation with the interior surface of the shaped glass, and means for chilling the glass to a non-moldable glass temperature during the movement of the glass over the contacting surface of the sizing member.

2. A chamber for containing molten glass and having an outlet for producing a molten glass stream, a glass-forming element for converting the stream into a tubular body having a continuous wall, and means for directing a reinforcing member into the wall of the tubular body and between the inner surface and the outer surface of the wall.

3. In a hollow glassware forming apparatus, a container for holding a supply of molten glass and having an outlet for producing a molten glass stream, a glass-shaping element for converting the stream into a hollow form, means for supporting the glass-shaping element adjacent said outlet and in position to receive glass discharged therefrom, means for directing a reinforcing member into the glass and progressive submergence of the member as the glass moves downwardly, and cooling means surrounding the reinforcing member.

4. In a reinforced hollow glassware forming apparatus, a container for holding a supply of molten glass and having an outlet for producing a downwardly moving molten glass stream, a glass-shaping element for converting the stream into a hollow form, means for supporting the glass-shaping element adjacent said outlet, a reinforcing member; a temperature control means located above the shaping element and surrounding the reinforcing member, and a guide member for engaging a part of the reinforcing member for guiding the reinforcing member into the molten glass wall as the glass wall is being formed by the shaping element, to embed the reinforcing member in uniformly spaced relation with respect to the surfaces of the wall and the axis of the hollow formed ware.

5. In a reinforced hollow glassware forming apparatus, a chamber for containing molten glass and having an outlet for producing a molten glass stream, a glass-shaping element for converting the stream into a hollow form, means for supporting the glass-shaping element adjacent said outlet, a refractory tube extending through the chamber and having open ends for directing a reinforcing member into the formed molten glass at the outlet to embed the reinforcing member in the glass stream, and cooling means located in the tube for cooling the reinforcing member and positioned just above the outlet.

6. In a hollow reinforced glassware-forming apparatus, a container for holding a supply of molten glass and having an outlet for producing a molten glass stream, a glass-shaping element for converting the stream into a hollow ware form, means for supporting the glass-shaping element adjacent said outlet, a hollow refractory body for directing a reinforcing member into the glass as the glass is hollowly ware formed, means for removing heat from the reinforcing member in advance of and as it is progressively downwardly moved by the downward movement of the molten glass, and a surface smoothing member supported within the downwardly moving hollow body of glass and spaced below the glass forming element for sizing the interior of the formed molten glass.

7. In a hollow glassware forming apparatus, a container for holding a supply of molten glass and having an outlet for producing a downwardly moving molten glass stream, a glass-shaping element for converting the stream into a hollow body, means for supporting the glass-shaping element adjacent said outlet, means for directing a reinforcing member into the molten glass body as the hollow glass body is formed, cooling means positioned above the shaping element for controlling the temperature of the reinforcing member, and a sizing member supported within the hollow form of molten glass and spaced below the shaping-element and in surface contact with the interior surface of the downwardly moving glass and within the embedded reinforcing member for interiorly sizing the ware.

8. Apparatus for forming hollow glassware comprising a container for molten glass, said container having an outlet through which the glass is discharged therefrom, a glass-shaping element for forming molten glass from said outlet into a downwardly flowing hollow body, a rigid sizing member positioned below said shaping element, supporting means for supporting the sizing member within the hollow body of downwardly flowing glass and in contact with the interior surface thereof, said supporting means being out of contact with the glass between the shaping element and the sizer, and means movable at substantially the same rate of speed as the downwardly moving body of glass for receiving the glass after it passes over the sizing member, said sizing member being positioned relative to the shaping element and the surface thereof being of sufficient length to impart rigidity to the glass as it passes thereover so as to provide a predetermined cross-sectional area in the resulting product.

9. Apparatus for forming hollow glassware comprising a container for molten glass, said container having an outlet through which the glass is discharged therefrom, a shaping element, means for supporting the shaping-element adjacent said outlet and in position to receive molten glass passing therethrough, a ware sizing member spaced below said shaping element and having a contact surface of sufficient length to fixedly determine the internal cross-sectional area of the downwardly moving body of glass, and supporting means for the sizing member extending upwardly through said outlet for supporting the sizing member in contact with the inner surface of the downwardly moving hollow body of glass.

10. Apparatus for forming hollow glassware comprising a container for molten glass, said container having an outlet through which the glass is discharged therefrom, a shaping element, means for supporting the shaping element adjacent said outlet and in position to receive molten glass passing therethrough, said shaping element being adapted to form the molten glass into a hollow downwardly flowing body, a ware sizing member spaced below said shaping element, means for supporting the sizing member in contact with the inner surface of the downwardly moving hollow body of glass, and means for cooling the sizing member and the support therefor.

11. Apparatus for forming hollow glassware comprising a source of molten glass, a glass-shaping element for receiving molten glass from said source and for forming it into a downwardly flowing hollow body, means for supporting the glass-shaping element adjacent said source, a sizing member spaced below said shaping element and having a surface positioned to contact the interior surface of the downwardly flowing body of glass, the glass contacting surface of the sizing member being of sufficient length to fixedly determine the interior diameter of the body of glass, and means positioned exteriorly of the downwardly flowing body of glass and arranged to cooperate with said sizing member for sizing the body of glass to predetermined internal and external cross-sectional areas.

12. Apparatus for forming hollow glassware comprising a source of molten glass, a glass-shaping element for receiving molten glass from said source and for forming it into a downwardly flowing hollow body, means for supporting the glass-shaping element adjacent said source, a sizing member spaced below said shaping element and having a surface positioned to contact the interior surface of the downwardly flowing body of glass, the glass contacting surface of the sizing member being of sufficient length to fixedly determine the interior diameter of the body of glass, means positioned exteriorly of the downwardly flowing body of glass and arranged to cooperate with said sizing member for sizing the body of glass to predetermined internal and external cross-sectional areas, and means for circulating a cooling fluid through said internal sizing member.

13. In a hollow glassware-forming apparatus, a container for holding a supply of molten glass, said container having an outlet for producing a molten glass stream, a glass-shaping element, means for supporting the glass-shaping element adjacent said outlet and in position to receive molten glass discharged therethrough, guide means for directing a reinforcing material into the downwardly flowing glass stream, a rigid sizing member supported within the ware-formed glass and in surface contact with the ware-formed glass for shaping or smoothing the interior surface thereof, and means for cooling the sizing member and the glass as it moves over the sizing member.

14. Apparatus for forming hollow glassware comprising a container for molten glass, said container having an outlet through which molten glass may be discharged therefrom, a glass-shaping element adjacent the outlet for forming the molten glass into a hollow, downwardly moving body, a rigid sizing member spaced from the glass-shaping element and positioned within the hollow, downwardly moving body of glass below said glass-shaping element, whereby the glass moves downwardly between the shaping element and the sizing member out of contact with both, said sizing member having an outer surface for contacting the inner surface of said body of glass, the glass-contacting surface of the sizing member being of sufficient length that the sizing member fixedly determines the internal cross-sectional area of the body of glass, and supporting means for supporting the sizer, said supporting means being out of contact with the glass for at least a part of the distance between the shaping element and the sizer.

15. Apparatus for forming hollow glassware comprising a container for molten glass, said container having an outlet through which molten glass is discharged therefrom, a glass-shaping element adjacent the outlet for forming molten glass discharged from said outlet into a downwardly moving hollow body, a sizing member spaced below the glass shaping element, and means for supporting the sizing member within the formed downwardly moving hollow body of glass, said supporting means being out of contact with the glass for at least a part of the distance between the shaping element and the sizer, whereby the glass moves between the glass-shaping element and the sizing member out of contact with either and out of contact with said supporting means, said sizing member having a surface adapted to contact the inner surface of the hollow body of glass beneath the shaping element, the glass-contacting surface of the sizing member being of sufficient length that the sizing member fixedly determines the internal cross-sectional area of the body of glass.

16. Apparatus for forming hollow glassware comprising a container for molten glass, a glass-shaping element adjacent the outlet for forming the molten glass into a hollow, downwardly moving body, a rigid sizing member spaced from the glass-shaping element and positioned within the hollow, downwardly moving body of glass below said glass-shaping element, and means for supporting the sizing member, said supporting means being out of contact with the glass for at least a part of the distance between the shaping element and the sizer, whereby the glass moves downwardly between the shaping element and the sizing member out of contact with both and out of contact with said supporting means for at least a part of the distance between the shaping element and the sizer, said sizing member having an outer surface for contacting the inner surface of said body of glass, the glass-contacting surface of the sizing member being of sufficient length that the sizing member fixedly determines the internal cross-sectional area of the body of glass, and means for cooling the sizing member and hence the body of glass as it passes over the sizing member.

17. Apparatus for forming hollow glassware comprising a container for molten glass, said container having an outlet through which the glass is discharged therefrom, a glass-shaping element, means for supporting the glass-shaping element adjacent said outlet and in position to receive molten glass passing therethrough, a ware-sizing member spaced below said shaping element and having a contact surface of sufficient length to fixedly determine the internal cross-sectional area of the downwardly moving body of glass, supporting means for the sizing member arranged to support said member in contact with the inner surface of the downwardly moving hollow body of glass, said supporting means being out of contact with the glass for at least a part of the distance between the shaping element and the sizer, and means for cooling the glass-contacting surface of the sizing member and for chilling the glass as it passes thereover.

18. Apparatus for forming hollow glassware comprising a container for molten glass, said container having an outlet through which the glass is discharged therefrom, a glass-shaping element, means for supporting the glass-shaping element adjacent the outlet and in position to receive molten glass passing therethrough, a sizing member spaced from said glass-shaping element, supporting means for supporting the sizing element below the shaping element and within the hollow body of glass formed by the shaping element, said supporting means being out of contact with the glass for at least a part of the distance between the shaping element and the sizer, said sizing member having a contacting surface for internally sizing said downwardly moving hollow body of glass, and means for cooling the sizing member and hence the body of glass as it passes over the sizing member.

19. Apparatus for forming hollow glassware comprising a container for molten glass, said container having an outlet through which molten glass is discharged therefrom, a glass-shaping element adapted to receive glass from said outlet and to form it into a downwardly flowing hollow body, and means for directing a reinforcing member into the molten glass as it is discharged from said outlet, said means being arranged to maintain the reinforcing member out of contact with the molten glass until it reaches said outlet for discharge therefrom.

20. Apparatus for forming hollow glassware comprising a container for molten glass, said container having an outlet through which molten glass is discharged therefrom, a glass-shaping element adapted to receive molten glass as it is discharged from said outlet and to form it into a downwardly flowing hollow body, a sizing member, means for supporting the sizing member within the downwardly moving hollow body, and means for directing a reinforcing member into the downwardly moving body of glass as it is discharged from said outlet and before passing over the sizing member, said means being arranged to maintain the reinforcing member out of contact with the molten glass until it reaches said outlet for discharge therefrom.

21. Apparatus for forming hollow glassware comprising a container for molten glass, said container having an outlet through which molten glass is discharged therefrom, a glass-shaping element adapted to receive molten glass as it is discharged from said outlet and to form it into a downwardly flowing hollow body, a sizing member, means for supporting the sizing member within the downwardly moving hollow body, means for directing a reinforcing member into the downwardly moving body of glass as it is discharged from said outlet and before passing over the sizing member, said means being arranged to maintain the reinforcing member out of contact with the molten glass until it reaches said outlet for discharge therefrom, and means movable at substantially the same rate of speed as the downwardly moving body of glass for receiving the glass as it passes over the sizing member.

22. Apparatus for forming hollow glassware comprising a source of molten glass, a glass-shaping element for forming glass into a hollow, downwardly moving body, means extending between said source and said glass-shaping element for delivering molten glass to the shaping element, a sizing member spaced from the glass-shaping element and positioned within the hollow, downwardly moving body of glass below said glass-shaping element, and means for supporting the sizing member in spaced relation to the glass-shaping element, said sizing member having an outer surface for contacting the inner surface of said body of glass, the glass-contacting surface of the sizing member being of sufficient length that the sizing member fixedly determines the internal cross-sectional area of the hollow glassware, and said supporting means, shaping element and sizer being arranged so that the molten glass moves for at least a part of the distance between the shaping element and the sizer out of contact with said support, shaping element and sizer.

23. Apparatus for forming hollow glassware comprising a source of molten glass, a glass-shaping element for forming glass into a hollow downwardly moving body, means extending between said source and said glass-shaping element for delivering molten glass to the shaping element, a sizing member positioned adjacent said shaping element and within the hollow downwardly moving body of glass, means for supporting the sizing member in contact with the inner surface of the downwardly moving hollow body of glass, said sizing member being of sufficient length to fixedly determine the internal cross-sectional area of the hollow glassware and said supporting means, shaping element and sizer being arranged so that the molten glass moves for at least a part of the distance between the shaping element and the sizer out of contact with said support, and means for cooling the sizing member.

EDWARD DANNER.